United States Patent [19]

Polák et al.

[11] 4,133,734
[45] Jan. 9, 1979

[54] PORTABLE SENSOR FOR MEASURING THE CORROSION ENDANGERING AND ELECTROCHEMICAL PROTECTION OF A METAL STRUCTURE BURIED IN AN ELECTROLYTE IN A CURRENT FIELD

[75] Inventors: Josef Polák; Lubomír Boubela; Josef Mrazek, all of Prague, Czechoslovakia

[73] Assignee: Chemoprojekt, projektova, Prague, Czechoslovakia

[21] Appl. No.: 811,248

[22] Filed: Jun. 29, 1977

[30] Foreign Application Priority Data

Jan. 7, 1976 [CS] Czechoslovakia .................. 4354-76

[51] Int. Cl.² ............................................. G01N 27/46
[52] U.S. Cl. ................................................ 204/195 C
[58] Field of Search .......................... 204/1 C, 195 C; 324/65 CR; 73/86

[56] References Cited

U.S. PATENT DOCUMENTS

| 2,947,679 | 8/1960 | Schaschl et al. | 204/195 C |
| 3,197,388 | 7/1965 | Marsh et al. | 204/1 C |
| 3,364,422 | 1/1968 | Heuze | 324/71 |

*Primary Examiner*—John H. Mack
*Assistant Examiner*—Aaron Weisstuch
*Attorney, Agent, or Firm*—Burgess, Ryan and Wayne

[57] ABSTRACT

A portable sensor for measuring the corrosion endangering and electrochemical protection of a metal structure buried in an electrolyte in a current field. An elongated carrier made of an electrically nonconductive material, whose longer dimension is at least double its shorter dimension, said carrier having two extremities, is provided with a reference electrode on one of its extremities, and the carrier is fitted with at least one other electrode, e.g., an auxiliary metal electrode.

3 Claims, 7 Drawing Figures

SECTION P-P'

PORTABLE SENSOR FOR MEASURING THE CORROSION ENDANGERING AND ELECTROCHEMICAL PROTECTION OF A METAL STRUCTURE BURIED IN AN ELECTROLYTE IN A CURRENT FIELD

BACKGROUND OF THE INVENTION

This invention relates to a portable corrosion sensor for measuring the corrosion or protective current of metal structures provided with a protective coating and buried in an electrolyte in a current field created by the operation of a cathodic- protection station or due to stray currents.

DESCRIPTION OF THE PRIOR ART

Up to now, various methods and various sensors have been used for measuring corrosion or protective currents of metal structures buried in a current field in an electrolyte. For the switchoff method, various specimens buried in the same electrolyte and recently permanently buried sensors are used. They contain auxiliary metal electrodes simulating holidays in the coating of the structure. These sensors usually have fixed reference electrodes. Even if the permanently buried sensors proved to be of advantage in practice, they are objectionable in that they are permanently buried and the places of their burying are not always chosen advantageously, because it is sometimes impossible to predict in which places the lowest density of protective current and the lowest value of potential will be achieved. Therefore, the measured values are not accurate. Also, for the determination of interference, it is sometimes not possible to use permanently buried sensors.

SUMMARY OF THE INVENTION

As herein described, there is provided a portable sensor for measuring the corrosion endangering and electrochemical protection of a metal structure buried in an electrolyte in a current field, said sensor containing an elongated carrier made of a dielectric material with the longer dimension of said carrier having two extremities, an electrode mounted on one of said extremities of the carrier and at least one more electrode being provided on the carrier.

DETAILED DESCRIPTION

According to the present invention, an elongated carrier made of an electrically non-conductive material, whose longer dimension is at least double its shorter dimension, is provided with an electrode on one of its ends and carries at least one additional electrode. For example, a sensor of this invention may be made by using a rod of electrically non-conductive material as carrier, one end of said rod being fitted with an electrode having a bare metal surface with a measuring area S, the axis of said electrode being identical with or parallel to the longitudinal axis of the carrier, while two additional electrodes having bare metal surfaces with measuring areas of from $S \times 10^{-1}$ to $S \times 10^{-2}$ and $S \times 10^{-2}$ to $S \times 10^{-4}$ are fitted on the carrier, a simulated protective coating being provided around said additional electrodes.

The sensor of this invention may also be arranged so that the carrier forms the lateral wall of a hollow body, the bottom of this body being formed by a metal electrode having a bare measuring surface with area S, while two additional metal electrodes with bare measuring surfaces are fitted opposite each other in the lateral wall with said measuring surfaces on the outside of the carrier, one of the electrodes fitted in the carrier wall having a measuring area of from $S \times 10^{-1}$ to $S \times 10^{-2}$, the other electrodes fitted in the carrier wall having measuring area of from $S \times 10^{-2}$ to $S \times 10^{-4}$ and protective coating being simulated around said measuring areas.

The sensor of this invention may preferably be arranged so that the electrode forming the bottom of the hollow carrier body is constructed as a reference electrode, e.g., a copper sulfate electrode, with at least one, but preferably two to three additional electrodes with bare measuring surfaces accommodated in the lateral wall of the carrier, said measuring surfaces differing from one another in area by at least one order of magnitude. The hollow body of the carrier may preferably be accomplished in the form of a cylinder, the electrodes having preferably the form of circular plates. It is also preferable to produce the metal electrodes of the same material as that of the protected structure. In an optimal embodiment of the sensor, the diameter 'd' of the metal electrode with the greatest measuring surface area S satisifes the relations $5d \leq h$ and $L \geq 6d$ where 'h' is the distance of the lower edge of the sensor from the level of electrolyte, e.g., depth under ground level when the sensor is buried, 'L' being the length of the carrier. At depths $h \geq 5d$, the contribution of the effect of ground level to the relative increase in ground resistance of a ground electrode with diameter 'd' is less than 5%. If soil is the electrolyte where the protected structure is buried, it is essential for obtaining good contact between the electrodes and soil to soak the backfill reaching up to the partition in the carrier with water. It is preferable, therefore, to provide the carrier having the shape of a hollow body, or the lateral wall of the hollow carrier body over the partition separating the portion of the carrier accommodating the electrodes from the other parts of the carrier, with regularly spaced holes and to pour water to the inside of the hollow carrier body. This results in thorough and uniform moistening of the soil surrounding the sensor and, consequently, in attaining a perfect contact of the electrodes with the environment.

The portable sensor of this invention may be used not only for the determination of interference, but also for measuring the degree of electrochemical protection. It may be used anywhere where the use of permanently installed sensors is impossible even for measuring the off-potential (polarization potential).

DESCRIPTION OF THE DRAWINGS

FIG. 1 is an example of the simplest modification of sensor 37 in its portable version. One end of a polyvinylchloride rod 80 cm long and 8 cm thick is fitted with electrode 17 in the form of a circular steel plate insulated on one side with a measuring area of bare metallic surface $S_1 = 100$ cm$^2$, another electrode 40 in the form of a circular steel plate insulated on one side with a measuring area of bare metallic surface $S_2 = 10$ cm$^2$ and still another electrode 50 likewise in the form of a circular steel plate insulated on one side with measuring area of bare metallic surface $S_3 = 1$ cm$^2$ being mounted on the carrier 39 at a distance of 10 cm from the electrode 17. Simulated pipe coating in the form of collars 38 of an electrically non-conductive material is provided around all the three electrodes 17, 40 and 50. Wires 41, 51, 175 connect the electrodes 17, 40 and 50 with terminals 52, 53 and 54, respectively.

FIG. 2 illustrates another modification of a large number of possible embodiments of the sensor 37 of this invention in longitudinal section while FIG. 3 shows a detail of the sensor in section $\overline{PP'}$, and FIG. 4 in section $\overline{AA'}$. The lateral wall 391 of the hollow carrier body 39 is made of a polyvinylchloride or polypropylene tube 100 cm long with an outside diameter of 12.5 cm. A steel electrode 17 with area $S_1 = 100$ cm$^2$ and diameter $d = 11.3$ cm is inserted into recess 392 in the lower end of the lateral wall 391 of carrier 39. At a height of 13 cm over the electrode 17 there is a partition 177 provided with hole 55 to bring out the wires 175, 41, 51. Two holes opposite each other are provided in the lateral wall 391 between the partition 177 and the electrode 17. Electrode 40 with area $S_2 = 10$ cm$^2$, secured in position by means of retaining ring 381 made of an electrically non-conductive material 4 mm thick simulating pipe coating of the same thickness, is inserted in one of the holes, electrode 50 with measuring area $S_3 = 1$ cm$^2$, held in position by retaining ring 382 made of an electrically non-conductive material 4 mm thick simulating pipe coating of the same thickness, being inserted into the other hole. The lower end of the lateral wall 391 is also provided with simulated pipe coating in the shape of a ring 38. The space between electrodes 17, 40, 50 and the partition 177 is filled with sealing compound 196. Terminals 52, 53, 54 are fitted in the upper section of the lateral wall 391 about 10 cm from its top edge, being connected via wires 175, 41 and 51 with electrodes 17, 40 and 50, respectively. Two opposite holes 393, 394 are drilled into the lateral wall 391 below its top edge permitting the sensor to be withdrawn from the electrolyte after the measurement has been terminated. Four additional holes 395, 396, 397, 398 are provided in the lateral wall 391 close over the partition 177 allowing the electrodes 17, 40, 50 to be flooded with water. The electrodes 17, 40, 50 are steel plates, the measuring areas of which are constituted by bare metallic surfaces.

FIGS. 5, 6, 7 show another embodiment of this invention. FIG. 5 illustrates the sensor of this invention in a section made in the plane of its longitudinal axis, while FIG. 6 is section $\overline{AA'}$ and FIG. 7 section $\overline{PP'}$, through said sensor. The sensor 37 is constructed in a manner such that the electrode 19 forming the bottom of a hollow carrier body 39 is provided as a copper sulfate reference electrode, two additional electrodes 40, 50, the measuring area of which comprises a bare metallic surface, being provided in the cylindrical wall 391 of the hollow carrier body 39. In the example of an embodiment, the reference electrode 19 is shown as constituting of a porous vessel 195 provided with insulating coating 57 wherein a cylindrical rod 191 of copper with purity at least 99.9% is placed in a filling 192 of crystalline copper sulfate flooded with a solution of copper sulfate through pipe 194. The vessel 195 is provided with closure 58, the pipe 194 being shut off with stopper 59. The reference electrode 19 is connected by means of wire 176 with terminal 53. The electrode 40 with measuring surface area $S_1 = 100$ cm$^2$ and diameter $d = 11.3$ cm, fitted in the wall 391 of the hollow carrier body 39, is connected by means of wire 41 with terminal 52, the electrode 50 with measuring surface area $S_2 = 10$ cm$^2$ being connected by means of wire 51 with terminal 54. The diameter of the reference electrode measuring surface area is $c = 4$ cm.

Figure 1:
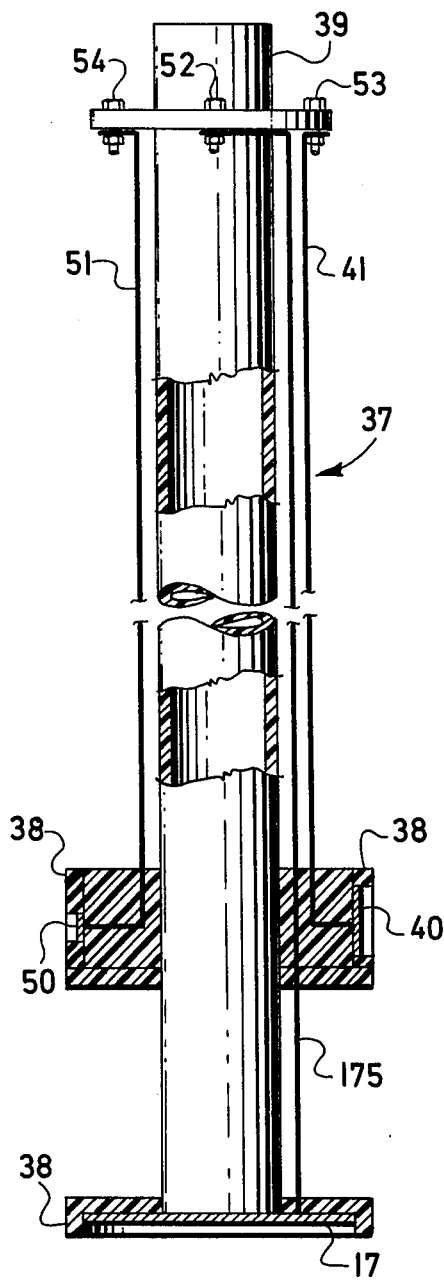
FIGS. 1 through 7 illustrate sensors 37 of this invention modified for use as portable devices wherein the auxiliary metal electrode 17 simulates minor holidays in the insulation of a coated metal structure.
Figure 2:
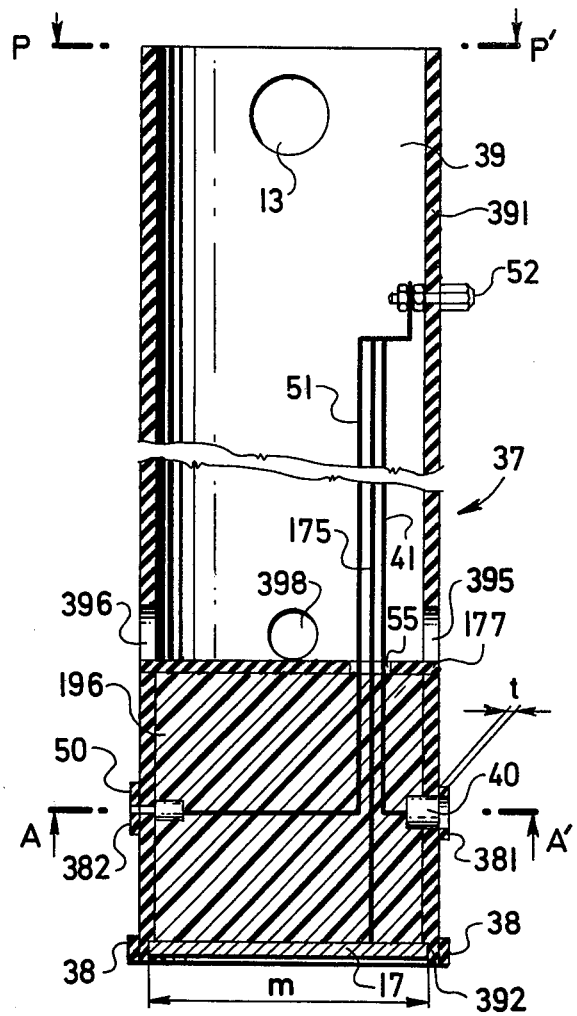
Figure 3:
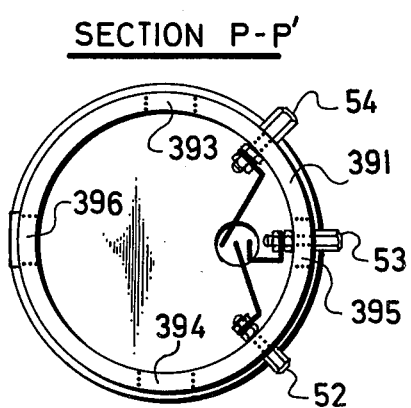
Figure 5:
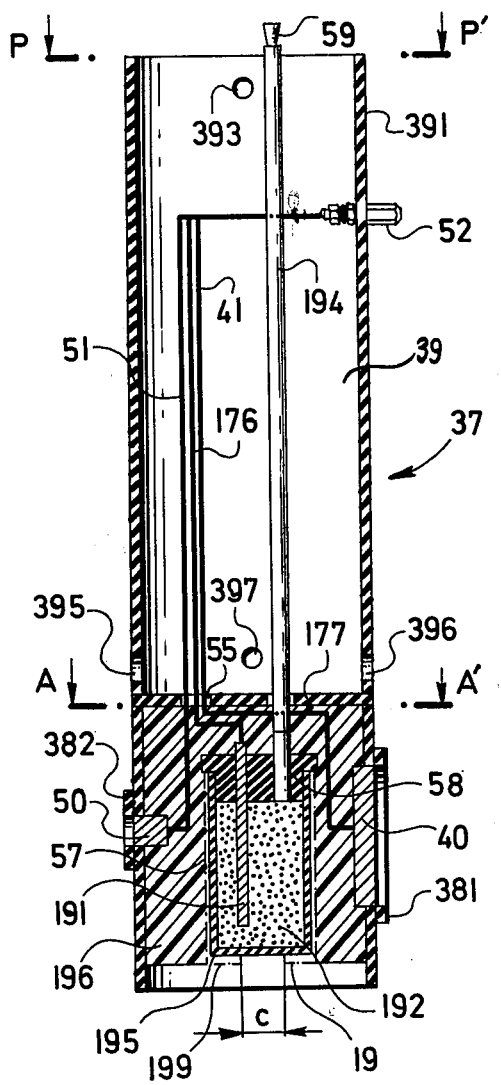
Figure 6:
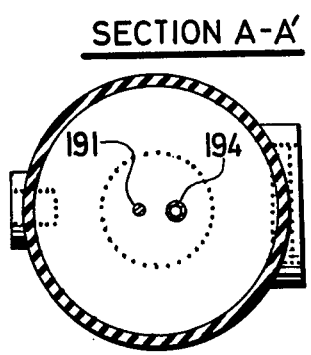
Figure 7:
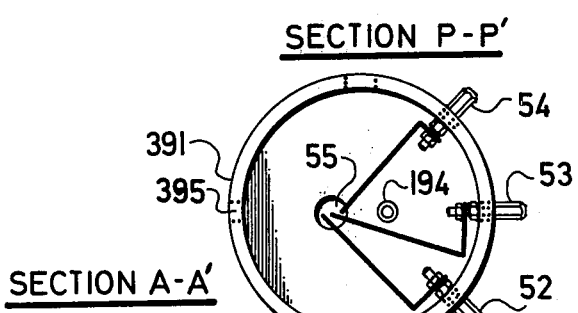
Figure 4:
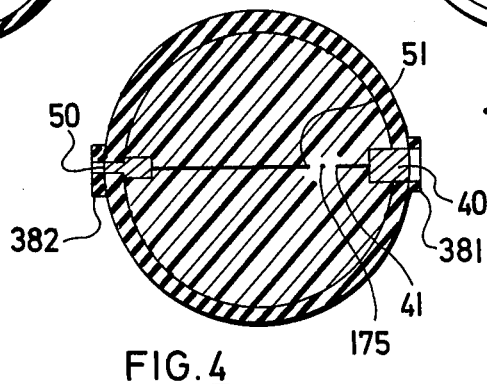

What we claim is:

1. A portable sensor for measuring the corrosion endangering and electrochemical protection of a metal structure buried in an electrolyte in a current field, said sensor comprising:

an elongated cylindrical carrier comprising a dielectric material with the longer dimension of said carrier having two opposing ends, said longer dimension of said carrier being at least double the shorter dimension thereof;

a first auxiliary metal electrode mounted on one end of the carrier, insulated on the side adjacent the carrier, said electrode having an axis parallel to the longitudinal axis of the carrier and a measuring area S on the bare metallic surface of said electrode;

second and third auxiliary metal electrodes mounted on the periphery of the carrier, each of said second and third electrodes being insulated on one side adjacent the carrier, said second and third electrodes being disposed opposite each other on the carrier with the axes thereof at right angles tp the longitudinal axis of said carrier, one of said second and third electrodes having a measuring area on the bare metallic surface thereof in the range of 0.1 that of S to 0.01 that of S, the measuring area on the bare metallic surface of the other of said two electrodes being in the range of 0.01 that of S to 0.0001 that of S.

2. A portable sensor for measuring the corrosion endangering and electrochemical protection of a metal structure buried in an electrolyte in a current field, said sensor comprising:

an elongated carrier comprising a shell of a dielectric material with the longer dimension of said carrier having two opposing ends, said longer dimension of said carrier being at least double the shorter dimension thereof, said shell having an external surface, an internal surface, and top and bottom surfaces;

the bottom of the shell of the carrier comprising a first metal electrode insulated on the side thereof adjacent said shell and having a measuring area S on the bare metallic surface thereof; the external surface of the shell of the carrier having a second metal electrode with a measuring area in the range of 0.1 that of S to 0.01 that of S and a third metal electrode with a measuring area in the range of 0.01 that of S to 0.0001 that of S, the second and third electrodes being situated on the external surface of said shell of the carrier on opposite sides of the first electrode.

3. A portable sensor for measuring the corrosion endangering and electrochemical protection of a metal structure buried in an electrolyte in a current field, said sensor comprising:

an elongated carrier comprising a shell of a dielectric material with the longer dimension of said carrier having two opposing ends, said longer dimension of said carrier being at least double the shorter dimension thereof, said shell having an external surface, an internal surface, and top and bottom surfaces comprising said ends; a first electrode disposed adjacent one of said ends of said shell; and two additional lateral electrodes fitted opposite each other on the outer surface of the shell of the carrier, the interior of the shell being provided with a partition disposed over the lateral electrodes parallel to the bottom of the shell of the carrier, the space bounded by the bottom of the shell, the lateral wall of said shell and the partition being filled with a sealing compound and the shell of the carrier being provided with at least one pair of holes over the partition.

* * * * *